UNITED STATES PATENT OFFICE.

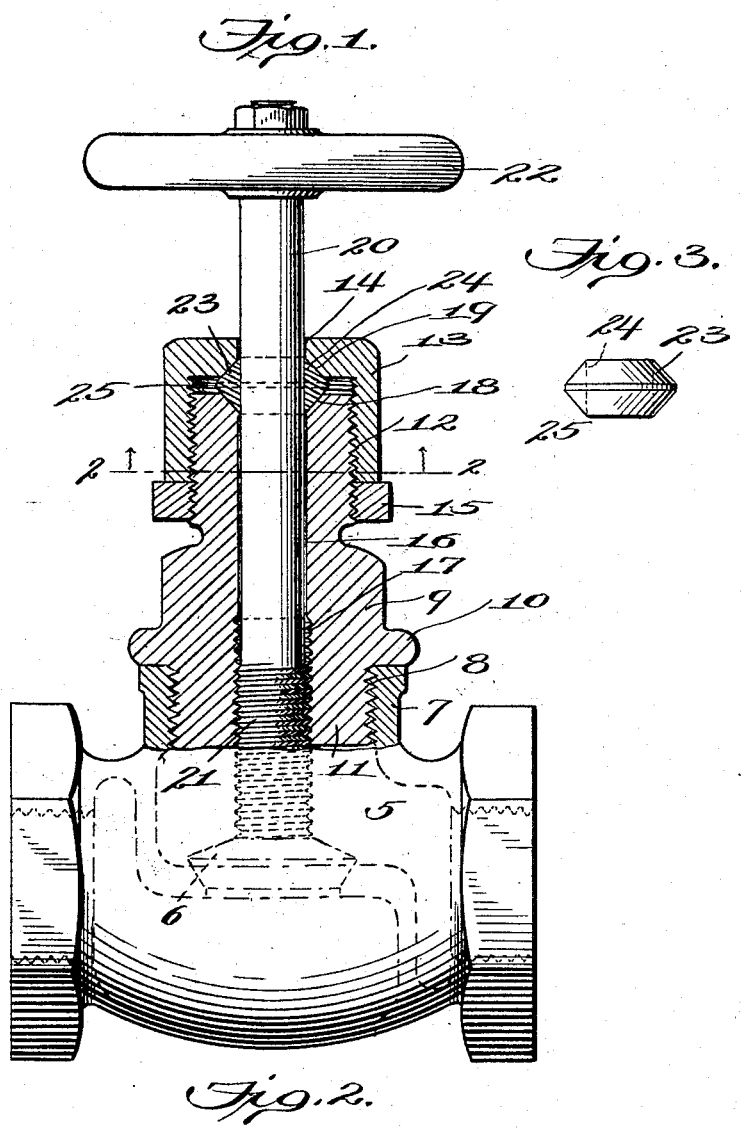

DAVID H. GRIFFITH, OF WILMINGTON, DELAWARE, ASSIGNOR OF ONE-HALF TO WILLIAM G. TICE, OF TRENTON, NEW JERSEY.

VALVE.

1,197,480.

Specification of Letters Patent.

Patented Sept. 5, 1916.

Application filed March 3, 1915. Serial No. 11,834.

*To all whom it may concern:*

Be it known that I, DAVID H. GRIFFITH, a citizen of the United States, residing at Wilmington, in the county of New Castle and State of Delaware, have invented new and useful Improvements in Valves, of which the following is a specification.

This invention relates to valves, and particularly to the guide nut or stem casing, bonnet, stem and packing for the latter.

The main object of the invention is to provide means for cleaning or clearing the valve stem of the residuum of corrosion, scales or other accumulations by movement of the stem in close relation to a portion of the guide nut or stem casing, and obviate wear by abrasion of the packing and prevent leakage around the stem and through the bonnet.

A further object of the invention is to so construct and dispose a packing ring or washer on the valve stem that opposing portions of the guide nut and bonnet will engage the said ring or washer at such opposite points at a distance from the outer periphery of the ring or washer as to always tend to force or squeeze the metal of the ring or washer inwardly toward the stem and thereby maintain a frictionally tight sliding fit between the stem and ring or washer and insure non-leakage between the parts of valves which are always liable to have a too free fitting association due to wear after a comparatively short usage.

A still further object of the invention is to generally improve valve structures and provide a novel form of bonnet, guide nut, packing and stem that may be readily substituted as a unit for corresponding parts of other valves without displacing the valve casings from their assemblage with pipe connections or mechanism with which they may be used.

With these and other objects and advantages in view, the invention consists in the construction and arrangement of parts which will be more fully hereinafter described and claimed.

In the drawing: Figure 1 is a sectional elevation of a valve embodying the features of the invention. Fig. 2 is a transverse section on the line 2—2, Fig. 1, looking in the direction of the arrows. Fig. 3 is a detail view of the packing ring or device for coöperation with the valve stem.

The numeral 5 designates the valve casing provided, as usual, with means for interposition between and connection to pipes or conduit means and having a valve 6 therein for controlling the open and closed condition of the inlet and outlet of the casing and the flow therethrough. The upper part of the casing has, as usual, a flanged collar 7 surrounding an inlet and interiorly screw-threaded, as at 8, to receive a guide nut 9 which, in turn, has a stop flange or rib 10 to bear upon the top of the collar 7 to limit the lower exterior screw-threaded extremity 11 of the guide nut into the upper portion of the valve casing or the collar 7. The upper extremity of the guide nut 9 is exteriorly screw-threaded, as at 12, to receive a bonnet 13 having a central bore or opening 14 in the top thereof and which is held in its adjusted position by a set nut 15 also engaging the upper screw-threaded extremity 12 of the guide nut. The guide nut has a central bore 16 continuing into a lower screw-threaded bore 17 which opens through the bottom of the guide nut 9. The upper portion of the bore 16 terminates at the lower end of a conical socket 18, and in the interior portion of the top of the bonnet 13 is a corresponding conical socket 19 into which the opening 14 continues, or said socket 19 is a part of the opening 14. It has been found in practice that the length of the bore 16 from the lower end of the socket 18 to the upper terminal of the screw-threaded portion 17 of the bore should be three times the diameter of the bore so as to give the best results relatively to a stem 20 movably projecting through the opening 14 and socket 19, bonnet 13 and the socket 18, bore 16, and screw-threaded-portion 17 of the latter bore formed in the guide nut, the stem 20 having lower screw threads 21 engaging the screw-threaded portion 17 of the bore in the guide nut. It will be understood that the stem 20 is connected, as usual, with the valve 6 in the casing 5 and has a hand-wheel or analogous device 22 on its upper end for readily and conveniently manipulating the said valve or to open and close the valve as may be desired.

Within the sockets 18 and 19, a packing ring or washer 23 is removably mounted and is preferably constructed of Babbitt metal. This ring or washer 23 is approximately of double frusto-conical form and has a bore 24 extending vertically therethrough of less diameter than the bore 16 so as to permit a sliding fit of the stem 20 therein. The ring or washer 23 has a central, vertically straight or plane surface 25 formed by removing the sharp or converged edge portion at the center which would otherwise exist by reason of the intersection of the oppositely inclined portions of the ring or washer. This intermediate plane surface 25 gives to the ring or washer 23 a more compact formation and removes all possibility of breakage or fracture at the intermediate portion thereof, particularly when the ring or washer is molded. Moreover, the opposite reversely inclined faces of the ring or washer 23 are of greater width than the depth of the corresponding sockets 18 and 19 so that the intermediate portion of the ring or washer stands between the bonnet 13 and the upper end of the guide nut 9, or in other words, the opposing upper and lower terminals of the sockets 18 and 19 which engage the reversely inclined faces of the ring or washer 23 at distances inwardly from the intermediate periphery or the plane surface 25 of the ring or washer confine the greater portion of the ring or washer therein, and there is, therefore, always an inward pressure exerted on the ring or washer toward the stem 20, and in view of the fact that the intermediate portion or the plane surface 25 and a part of the adjacent opposed reversely inclined faces of the ring or washer stand clear of engagement with relation to the sockets 18 and 19, the inward pressing or squeezing action against the ring or washer 23 by the bonnet 13 and the guide nut 9 when the bonnet is tightened or screwed down over the upper portion of the said guide nut is insured. The continual tendency toward inward pressure on the ring or washer 23 would not be nearly so great or so effective if the said ring or washer were wholly inclosed within the sockets 18 and 19, and it may be properly said that the construction and arrangement of the ring or washer 23 and its particular association with the sockets 18 and 19, as just explained, results in an adjusting provision or a tightening relationship between the ring or washer and the portion of the stem engaged thereby through the movement of the bonnet downwardly over the guide nut. The smooth portion 16 of the bore is but slightly greater in diameter than the smooth portion of the stem 20 which moves therein, and the object of the long bore and correspondingly long smooth portion of the stem is to cause the wall of the bore 16 to crush off or comminute any residuum of corrosion, scales or other accumulations on the said part of the stem and thoroughly clean the stem or reduce the matter that may adhere thereto to such degree of fineness as to avoid injury to and wear upon the ring or washer 23 by the movement of the stem 20 therethrough. As a consequence, the ring or washer 23 will have a more lasting service by reason of a minimized wear thereon, and a tight joint will be at all times maintained and leakage around the stem and through the packing ring or washer 23 will be avoided, thus providing a valve organization which is materially advantageous.

It will be observed that the guide nut 9, bonnet 13, packing 23 and stem 20 may be applied as a unit to any valve now in use to replace analogous structures differing in organization from that embodying the features of the invention, and such substitution of the improved structure may be effected without disturbing the valve casing 5 or disconnecting the latter from the pipes or other devices with which it may be associated.

What is claimed is:—

The combination of a casing having a valve therein, a guide nut mounted in the casing and formed with a bore having screw threads at the extremity thereof adjacent to the end of the nut attached to the casing and the remaining longer portion of the bore being smooth and terminating at the opposite end in a conically shaped socket, a bonnet adjustably mounted on the guide nut and having an opening therethrough terminating in an inner conically shaped socket which alines with and is of the same dimensions as the socket of the guide nut, a stem movable through the bonnet and guide nut and connected to the said valve, the stem having screw threads extending partially thereover to engage the threads of the bore, the remaining portion of the stem being of less diameter than and movable in the longer smooth portion of the bore to effect a cleaning function relatively to the said stem, and a packing ring having an opening therethrough of approximately the same diameter as the stem and of uniform diameter from end to end and snugly fitting and fully engaging the stem throughout the full length of said opening, the packing ring having opposite faces reversely inclined toward a central point where a straight or plane surface is formed to avoid an intermediate sharp edge, the sockets of the guide nut and bonnet snugly engaging the opposite inclined faces of the packing ring to equally force the wall of the opening through the packing ring toward and maintain a continuous tight bearing of the said wall against the stem, the intermediate part of the ring being held at all times out of contact with any part of the nut or bonnet.

In testimony whereof I have hereunto set my hand in presence of two subscribing witnesses.

DAVID H. GRIFFITH.

Witnesses:
R. D. SHELDON,
G. H. CLARK.

Copies of this patent may be obtained for five cents each, by addressing the "Commissioner of Patents, Washington, D. C."